(12) United States Patent
Bespalov et al.

(10) Patent No.: US 7,420,367 B2
(45) Date of Patent: Sep. 2, 2008

(54) HIGH-FREQUENCY INDUCTION IMAGER WITH CONCENTRIC COILS FOR MWD AND WIRELINE APPLICATIONS

(75) Inventors: Alexandre Bespalov, Spring, TX (US); Michael B. Rabinovich, Houston, TX (US); Leonty A. Tabarovsky, Cypress, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 316 days.

(21) Appl. No.: 11/220,440

(22) Filed: Sep. 7, 2005

(65) Prior Publication Data

US 2006/0103389 A1  May 18, 2006

Related U.S. Application Data

(60) Provisional application No. 60/608,668, filed on Sep. 10, 2004.

(51) Int. Cl.
  *G01V 3/00* (2006.01)
(52) U.S. Cl. ..................... 324/303; 324/338
(58) Field of Classification Search ............ 324/303, 324/318, 322, 338
  See application file for complete search history.

(56) References Cited

U.S. PATENT DOCUMENTS

| | | | |
|---|---|---|---|
| 2,930,969 A | 3/1960 | Baker | |
| 2,997,645 A | 8/1961 | Huddleston, Jr. et al. | 324/6 |
| 3,365,658 A | 1/1968 | Birdwell | |
| 4,122,387 A | 10/1978 | Ajam et al. | |
| 4,468,623 A | 8/1984 | Gianzero et al. | |
| 4,712,070 A | 12/1987 | Clark et al. | 324/338 |
| 4,980,642 A | 12/1990 | Rodney | 324/325 |
| 5,502,686 A | 3/1996 | Dory et al. | |
| 6,002,256 A | 12/1999 | Slade | 324/322 |
| 6,018,243 A * | 1/2000 | Taicher et al. | 324/303 |
| 6,060,882 A | 5/2000 | Doty | 324/318 |
| 6,100,696 A | 8/2000 | Sinclair | 324/339 |
| 6,459,262 B1 * | 10/2002 | Wisler et al. | 324/303 |
| 6,559,640 B2 * | 5/2003 | Taicher | 324/303 |
| 6,586,932 B1 * | 7/2003 | Taherian et al. | 324/303 |
| 6,600,321 B2 | 7/2003 | Evans | |
| 6,714,014 B2 | 3/2004 | Evans et al. | |
| 2003/0051914 A1 | 3/2003 | Bittar | 175/45 |
| 2003/0229450 A1 | 12/2003 | Strickland | 702/10 |
| 2005/0212520 A1 | 9/2005 | Homan et al. | 324/338 |

FOREIGN PATENT DOCUMENTS

| | | |
|---|---|---|
| CA | 685727 | 5/1964 |
| GB | 2279149 | 12/1994 |
| WO | WO99/08126 | 2/1999 |

* cited by examiner

*Primary Examiner*—Louis M Arana
(74) *Attorney, Agent, or Firm*—Madan, Mossman & Sriram, P.C.

(57) ABSTRACT

An induction logging tool having concentric transmitter and receiver antennas can be used to make measurements of earth formations at frequencies up to 500 MHz. The antennas may be mounted on the mandrel of a bottomhole assembly for MWD applications, or may be pad mounted for wireline applications. Litz winding is used in the coils to minimize eddy current losses. The antennas may be formed on a flexible circuit board.

23 Claims, 16 Drawing Sheets

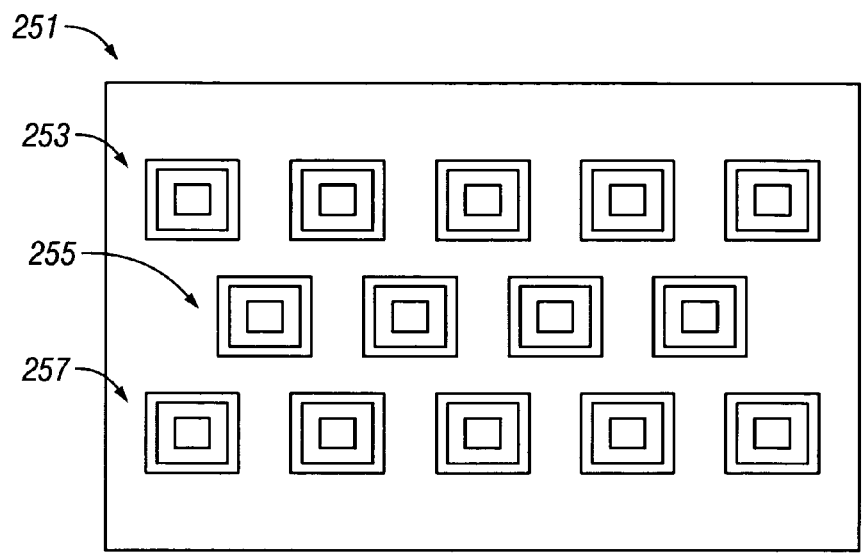
FIG. 7
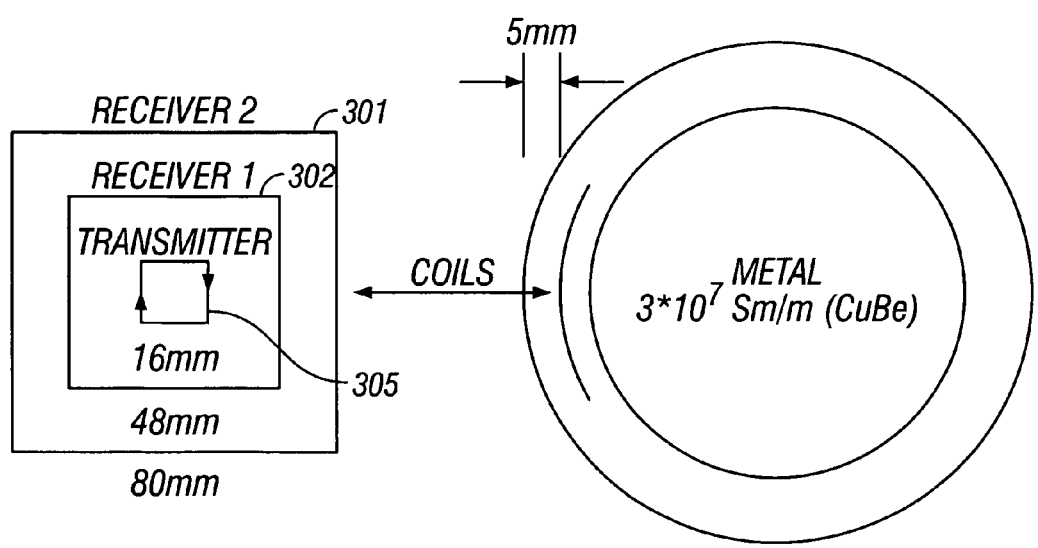
FIG. 8A
FIG. 8B

HIGH-FREQUENCY INDUCTION IMAGER WITH CONCENTRIC COILS FOR MWD AND WIRELINE APPLICATIONS

CROSS-REFERENCES TO RELATED APPLICATIONS

This application claims priority from U.S. Provisional Patent Application Ser. No. 60/608,668 filed on Sep. 10, 2004.

BACKGROUND OF THE INVENTION

1. Field of the Invention

The present invention relates to well logging. In particular, the present invention is an apparatus and method for imaging of subsurface formations using electrical methods.

2. Background of the Art

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems.

Techniques for investigating the earth formation with arrays of measuring electrodes have been proposed. See, for example, the U.S. Pat. No. 2,930,969 to Baker, Canadian Pat. No. 685,727 to Mann et al., U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

U.S. Pat. No. 6,714,014 to Evans et al., the contents of which are fully incorporated herein by reference, discloses a device suitable for resistivity imaging with water based mud (WBM) and oil based mud (OBM). The device disclosed in the Evans '014 patent is basically a wireline logging device. U.S. Pat. No. 6,600,321 to Evans discloses a modification of the Evans '321 patent that is adapted for use in measurement while drilling (MWD) applications. Both of the Evans' patents have pad mounted electrodes that are in contact with the earth formation.

The devices described above are galvanic devices in which current is injected into the formation. With the exception of the Evans patents, they only work when the borehole is filled with a conducting fluid. U.S. patent application Ser. No. 10/657,870 of Ritter et al., filed on Sep. 9, 2003 and the contents of which are fully incorporated herein by reference, teaches the use of galvanic, induction and propagation resistivity devices for borehole imaging in MWD applications. The resistivity sensor may be mounted on a pad, rib, or a stabilizer. Specifically disclosed therein are a shielded dipole antenna and a quadrupole antenna. In addition, the use of ground penetrating radar with an operating frequency of 500 MHz to 1 GHz is disclosed. Ritter may involve an arrangement for maintaining the antenna at a specified offset from the borehole wall using, for example, hard facing.

An important aspect of any downhole electromagnetic tool is the ability to reduce power requirements. The devices discussed above do not address this issue. One parameter for estimating antenna performance is its electrical quality Q. This is important for antennas operating in a tuned mode (resonant tank) or transmitting device. Optimizing antenna quality would result in minimization of unproductive losses and improving tool measurement accuracy. The quality factor is given by $$Q = \frac{2\pi f L}{r} \quad (1)$$

where f is the frequency, L is the inductance of antenna and r presents its active losses (or resistance). The Q is also an indication of the signal to noise ratio that can be achieved using an antenna. Maximizing Q can be done by maximizing the inductance and minimizing the resistance. An excessively large inductance can be a serious limitation in practical design as the antenna becomes sensitive to unavoidable stray capacitances and imperfections in the electronics.

Intrinsic losses in RF antennas are generally caused by a non-uniform current density in a conductor cross section and by eddy currents induced in a conductor by the magnetic field produced by a neighboring conductor. An alternating current in a conductor tends to flow in the proximity of its surface. The depth of current penetration inside the conductor is inversely proportional to the tool operating frequency and the electrical conductivity of the conductor. When transmitter and multiple receiver antennas are in close proximity to each other this effect can become even more significant.

Another issue that has not been addressed, particularly with respect to MWD resistivity tools, is that of conforming the antennas to a curved surface. Antennas currently produced have a rigid assembly that has to be deformed to fit the curved surface of a downhole MWD tool. A need exists for a downhole resistivity tool that has a flexible antenna, not affected by the type of borehole fluid, insensitive to stray capacitances, and has a high resolution. The present invention satisfies this need.

SUMMARY OF THE INVENTION

One embodiment of the invention is an antenna for downhole use. The antenna includes at least two terminals and at least one trace connected at its ends to the at least two terminals. The at least one trace includes a cross-over region capable of producing a Litz effect in the antenna. The trace may further include an internal cross-over region which increases the Litz effect. The trace may further include an upper section and a lower section.

Another embodiment of the invention is an apparatus for evaluating an earth formation. The apparatus includes a downhole assembly conveyed in a borehole in the earth formation. The apparatus also includes at least one transmitter antenna on the downhole assembly which propagates an electromagnetic filed into the earth formation, and further includes at least one receiver antenna substantially concentric with the at least one transmitter antenna, wherein the receiver antenna produces a signal resulting from an interaction of the electromagnetic field with the earth formation, the signal being indicative of a property of the earth formation. The axes of the antennas are inclined to a longitudinal axis of the borehole. The downhole assembly may be conveyed into the borehole on a drilling tubular, a wireline or a slickline. The apparatus may further include a processor which estimates the property of the earth formation from the signal. Two receiver antennas may be used with the processor determining the property of the earth formation from the amplitude ratio or the phase difference of signals at the two receiver antennas. The processor may use a toolface angle of the downhole assembly to provide an image of a wall of the borehole. The apparatus may include an accelerometer whose output is used by the processor to determine the depth of the downhole assembly. The transmitter may be operated at more than one frequency with the processor using signals at the more than one frequency to determine a dielectric constant of the formation. The transmitter and/or receiver antennas may include a cross-over region capable of producing a Litz effect. The transmitter and the receiver antennas may be incorporated on a printed circuit board. The printed circuit board may be shaped like a sector of a cylinder. The apparatus may also include a shield which magnetically isolates a metallic portion of a drill collar carrying the downhole assembly from the transmitter and receiver antennas. The transmitter and receiver antennas may be mounted on a pad extendable from a body of the downhole assembly.

Another embodiment of the invention is a method of evaluating an earth formation. An electromagnetic signal is propagated into the earth formation using at least one transmitter on a downhole assembly conveyed into a borehole in the earth formation. At least one receiver antenna substantially concentric with the transmitter antenna receives a signal resulting from interaction of the electromagnetic field with the earth formation. The axes of the transmitter and receiver are inclined to a longitudinal axis of the borehole. A conductivity, resistivity and/or relaxation time of a nuclear spin of the formation may be determined. The downhole assembly may be conveyed into the borehole using a drilling tubular, wireline or slickline. The transmitter and/or the receiver antennas may include a cross-over region capable of producing a Litz effect. The method may further include magnetically isolating a metallic portion of a drill collar carrying the downhole assembly from the transmitter antenna and the receiver antenna. The antennas may be positioned on a pad extendable from a body of the assembly. Two receiver antennas may be used and the property of the earth formation may be determined from the amplitude ratio and/or the phase difference of signals at the two receivers. The transmitter may be operated at multiple frequencies and a dielectric constant of the formation may be determined from the signals at the multiple frequencies.

Another embodiment of the invention is a computer readable medium for use with an apparatus for evaluating an earth formation. The apparatus includes a transmitter which transmits an electromagnetic signal into the earth formation and a receiver concentric with the transmitter which receives a signal resulting from interaction of the electromagnetic signal with the earth formation. The transmitter and receiver antennas have axes inclined to the borehole axis. The medium includes instructions which enable a processor to determine from the signal a property of the earth formation. The medium may include a ROM, a CD-ROM, an EPROM, an EAROM, a flash memory and/or an optical disk.

BRIEF DESCRIPTION OF THE FIGURES

The novel features that are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention, and wherein:

FIG. 7 shows an optional arrangement of antennas in the present invention;

FIGS. 8a, and 8b illustrate a typical geometry of coils arranged on a curved surface;

DETAILED DESCRIPTION OF THE INVENTION

Figure 1:
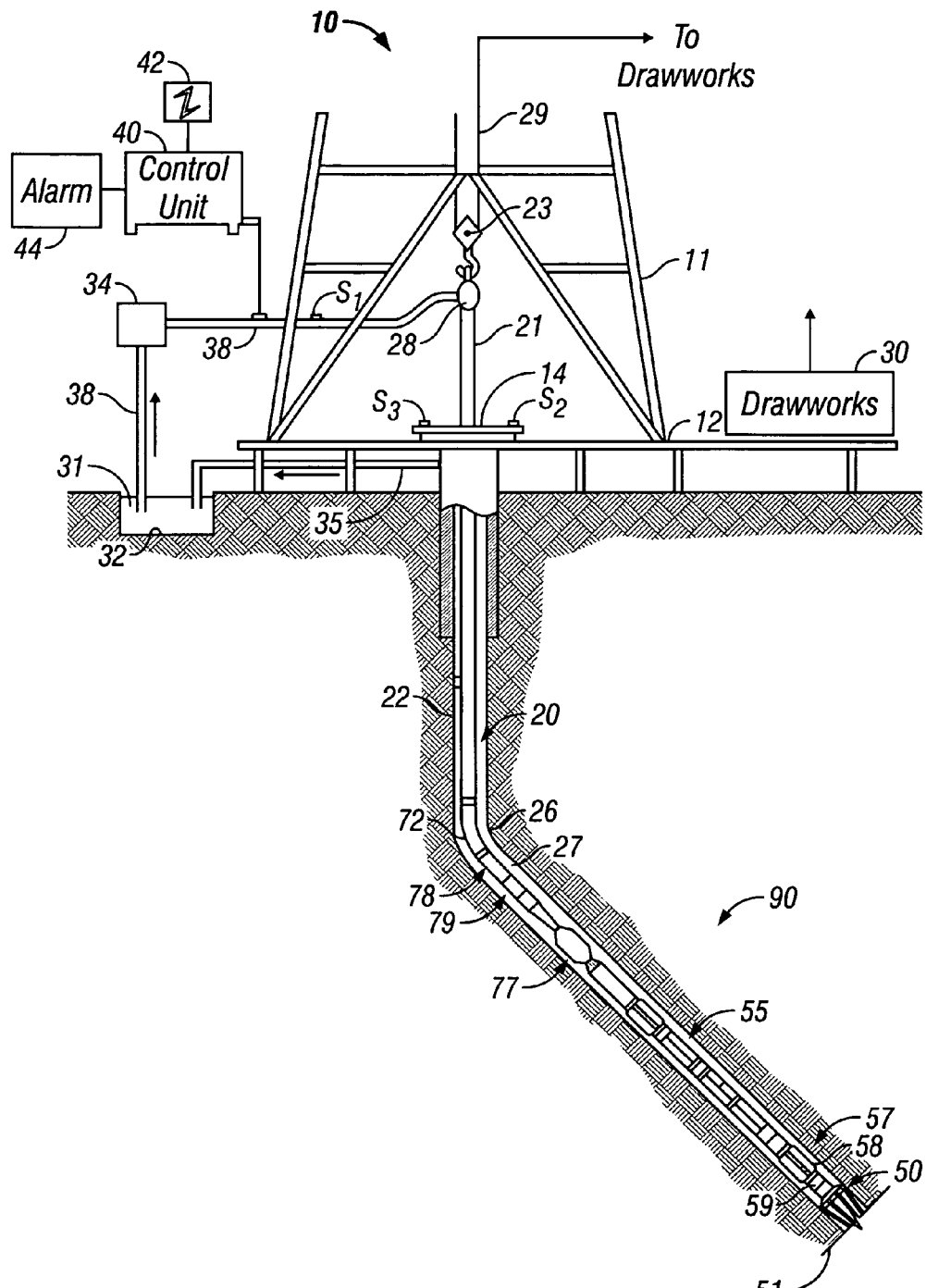
FIG. 1 (prior art) is a schematic illustration of a drilling system.

FIG. 1 shows a schematic diagram of a drilling system 10 with a drillstring 20 carrying a drilling assembly 90 (also referred to as the bottom-hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), into the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger, fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 2:
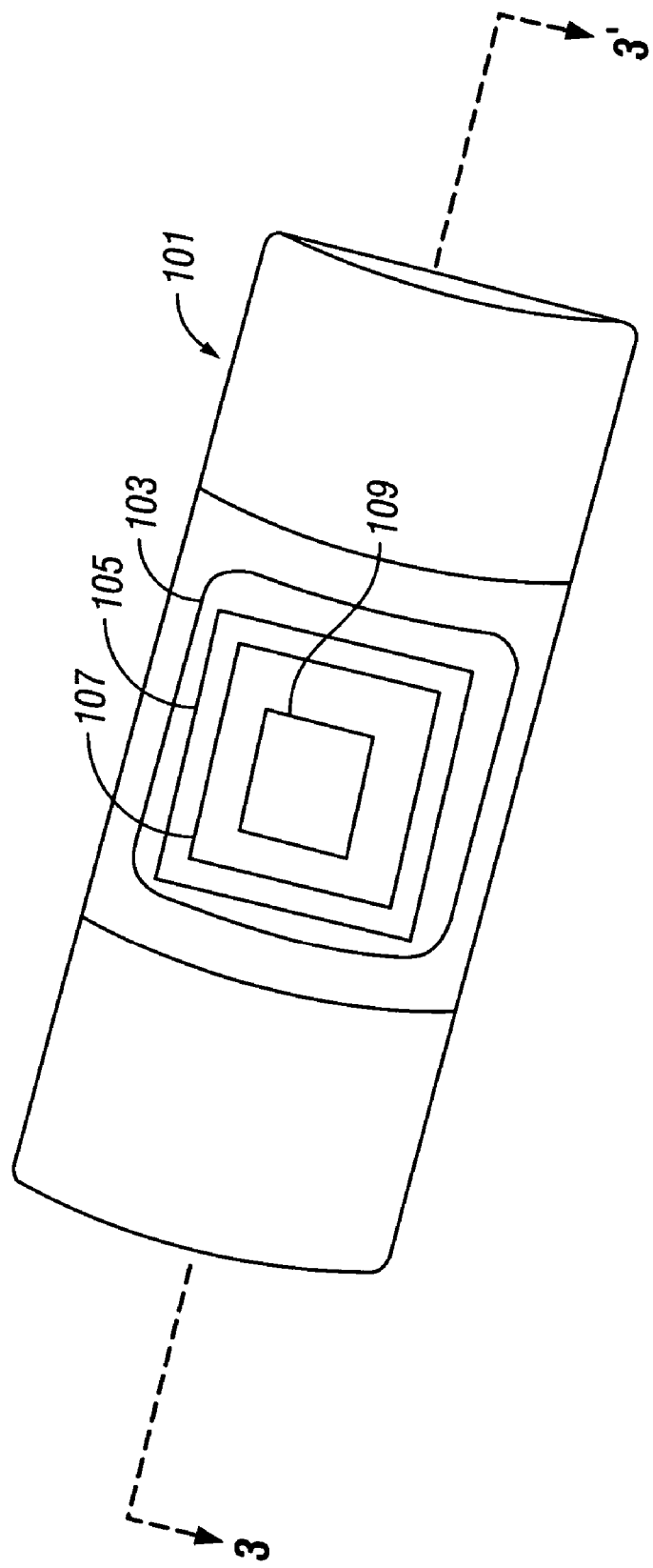
FIG. 2 illustrates one embodiment of the present invention on a drill collar.

Turning now to FIG. 2, one configuration of a resistivity sensor for MWD applications is shown. Shown is a section of a drill collar 101 with a recessed portion 103. The drill collar forms part of the bottomhole assembly (BHA) discussed above for drilling a wellbore. For the purposes of this document, the BHA may also be referred to a downhole assembly. Within the recessed portion, there is a transmitter antenna 109 and two receiver antennas 105, 107 (the far receiver or receiver R2, and the near receiver or receiver R1) that are substantially concentric with the transmitter antenna. It is to be noted that the term "concentric" has two dictionary definitions. One is "having a common center", and the other is "having a common axis." The term concentric as used herein is intended to cover both meanings of the term. As can be seen, the axis of the transmitter antenna and the receiver antenna is substantially orthogonal to the longitudinal axis of the tool (and the borehole in which it is conveyed). Based on simulation results (not shown) it has been found that having the transmitter antenna with an axis parallel to the borehole (and tool) axis does not give adequate resolution.

Figure 3:
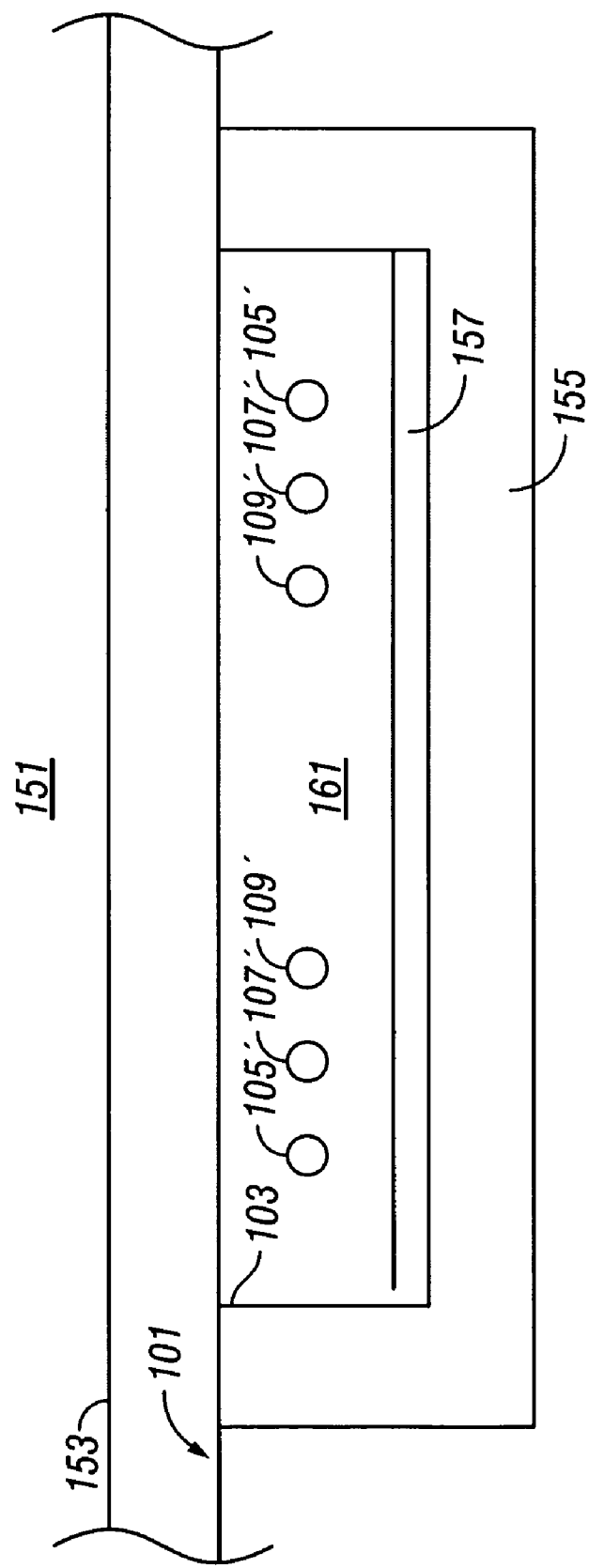
FIG. 3 is a sectional view of the arrangement of FIG. 2.

For the purposes of this document, the combination of the transmitter antenna and two receiver antennas are referred to as the resistivity sensor. This is shown in cross section in FIG. 3 with the drill collar 101 proximate to the borehole wall 153 and the earth formation 151. Within the recessed portion 103 are the antennas, denoted in cross section by 105', 107', and 109'. The antennas are embedded in insulating material 161 and separated from a metal base 155 of recess 103. Optionally, a ferrite shield 157 may be provided to magnetically isolate the antennas from the metal base.

The present invention typically operates at frequencies between 20 MHz and 200 MHz. This is considerably higher than the typical frequency range of 20 kHz to 200 kHz of prior art induction resistivity devices. The resonant frequency of a tank circuit is given by:

$$f = \frac{1}{2\pi\sqrt{LC}} \quad (2)$$

where C is the capacitance, and L is the inductance. It can be seen that the inductance would need to be low in order to operate at higher frequencies and hence the Q (given by eqn. 1) would drop. Note that for a given capacitance, the inductance required for tuning as given by eqn. (2) is inversely proportional to the square of the frequency: Other conditions remaining the same, the Q is proportional to $f^{-1.5}$.

Figure 4:
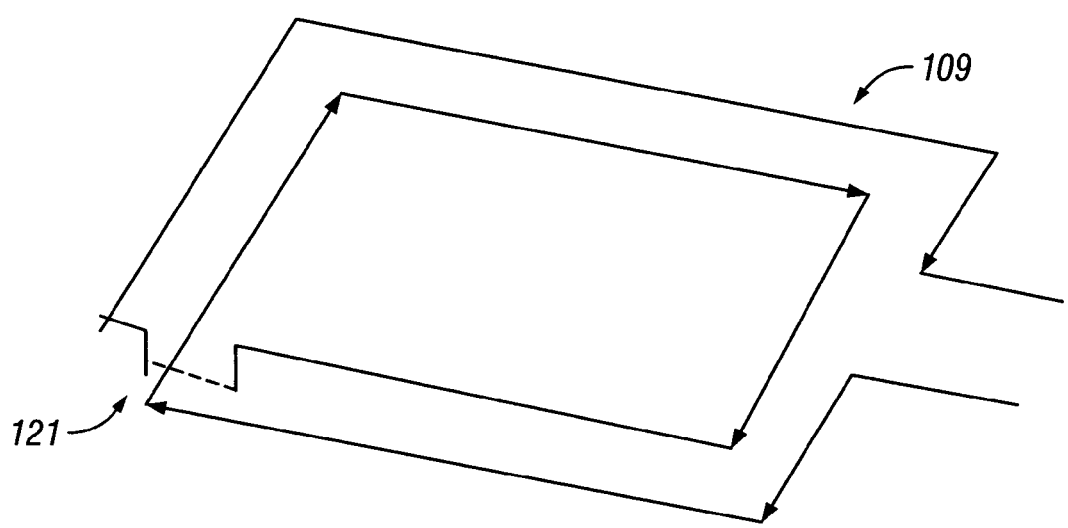
FIG. 4 illustrates an embodiment of the invention in which antenna coils have a Litz configuration.

In one embodiment of the invention, the antenna coil is made of Litz wire (from the German Litzendraht, woven wire) to mitigate the skin effect. A Litz wire consists of a number of insulated wire strands woven together in a carefully designed pattern, so that the overall magnetic field acts equally on all the wires and causes the total current to be distributed equally among them. A simple example of a Litz antenna is shown in FIG. 4 where the antenna 109" has a crossover 121. Another example is given in FIG. 5.

Figure 5:
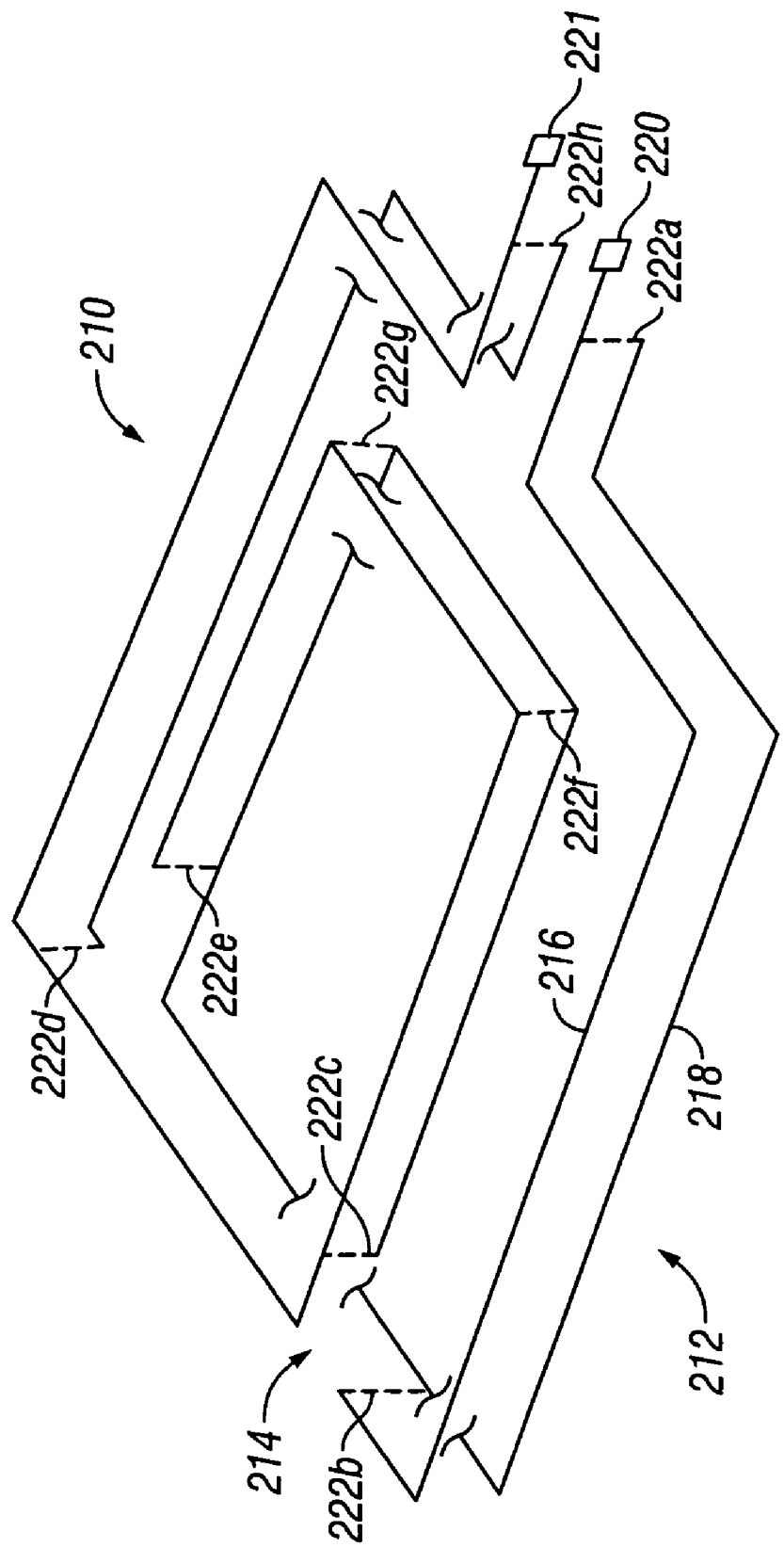
FIG. 5 illustrates another arrangement of Litz coils in an antenna.

FIG. 5 shows an antenna 210 having a single crossover 214a. The trace 212 of the antenna 210 comprises multiple runs including an upper section 216 and a lower section 218. At the ends of the trace 212 are connectors 220, 221 capable of providing communication between the antenna 210 and the downhole electronics. These sections 216 and 218 are disposed generally atop one another along most of their respective lengths. The sections 216 and 218 are in electrical contact with one another by a series of links 222a, 222b, 222c, 222d, 222e, 222f, 222g, 222h. The sections 216 and 218 may be separated by an insulating barrier. In one embodiment of the invention, sections 216 and 218 may comprise multiple conductors and may be implemented as a printed circuit board. Furthermore, the transmitter antenna and the receiver antennas may be incorporated into a single circuit board. The circuit board may be in the form of a cylindrical sector so as to conform to the curvature of a tool mandrel. This further facilitates manufacture of the logging tool and setting up and repair work if something goes wrong. Multiple runs of wire can be opposite sides of an insulating substrate made of a resilient flexible material such as KAPTON® and a crossover provided through the substrate. The advantage of having the antennas on a flexible substrate is that all the antennas can be "potted" ahead of time and inserted into the recess on the drill collar.

For MWD applications, rotation of a single sensor and the relatively low rate of penetration is usually adequate to provide an image of the borehole wall with sufficient resolution. However, in an alternate embodiment of the invention, two or more sensors may be provided on opposite sides of the drill collar. For wireline applications, however, additional sensors are needed to provide the needed resolution. This is discussed next.

Figure 6:
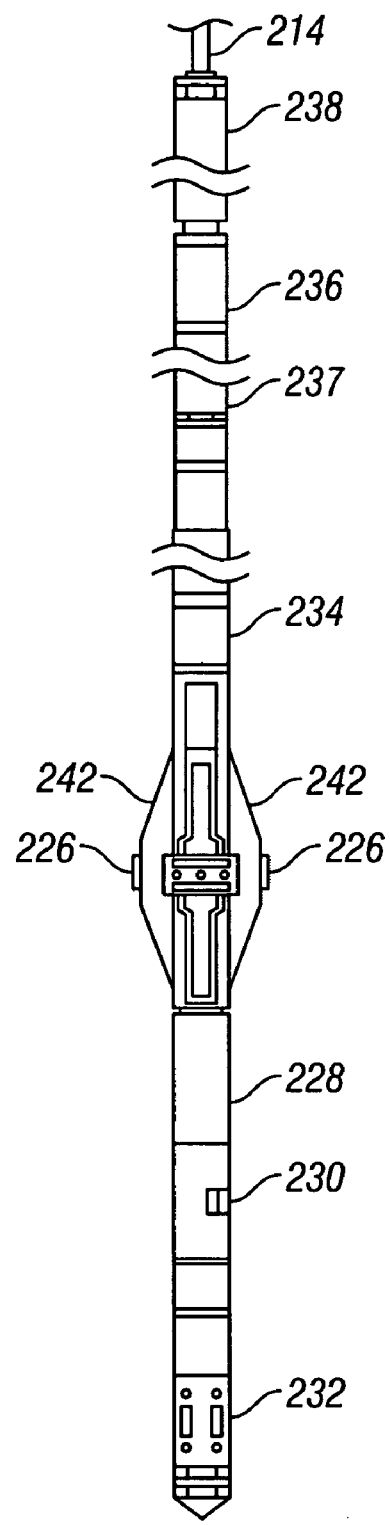
FIG. 6 illustrates an arrangement of the present invention for wireline applications.

FIG. 6 is a schematic external view of a portion of a logging string including a borehole sidewall imager system conveyed on a downhole. For the purposes of the present invention, the logging string may also be referred to as a downhole assembly. The downhole assembly is conveyed on a wireline 214 and comprises pad mounted resistivity arrays 226 pushed against the borehole wall by suitable mechanical arrangements 242 such as bowsprings. Optionally, a mud cell 230 and a circumferential acoustic televiewer 232 may be provided. Electronics modules 228 and 238 may be located at suitable locations in the system and not necessarily in the locations indicated. The components may be mounted on a mandrel 234 in a conventional well-known manner. The outer diameter of the assembly is about 5 inches (12.5 cm) and about fifteen feet (4.57 m) long. An orientation module 236 including a magnetometer and an accelerometer or inertial guidance system may be mounted above the imaging assemblies 226 and 232. The upper portion of the tool 10 contains a telemetry module 238 for sampling, digitizing and transmission of the data samples from the various components uphole to surface electronics in a conventional manner. If acoustic data are acquired, they are preferably digitized, although in an alternate arrangement, the data may be retained in analog form for transmission to the surface where it is later digitized by surface electronics.

In FIG. 6 three pad mounted resistivity arrays 226 are shown. A fourth pad mounted array is hidden in this view. Referring to FIG. 7, each pad 251 includes rows 253, 255, 257 of resistivity sensors. Three rows are shown in FIG. 7 with an overlapped arrangement so that complete azimuthal coverage can be obtained. Other arrangements, including those in which there is incomplete azimuthal coverage, can also be used. Each of the resistivity sensors, includes a transmitter and two receivers as described above and shown in FIG. 2.

To illustrate the sensitivity of the instrument, simulations were done with the model shown in FIGS. 8A and 8B. As shown in FIG. 8A, the transmitter antenna 305 was a 16 mm square and the two receiver antennas 303, 301 were squares of size 48 mm and 80 mm. As shown in FIG. 8B, the coils were positioned 5 mm from the surface and the total thickness of the insulator was 10 mm. The conductivity of the insulator was $10^{-4}$ Sm/m while the conductivity of the metal was $3\times10^7$ Sm/m.

Figure 9:
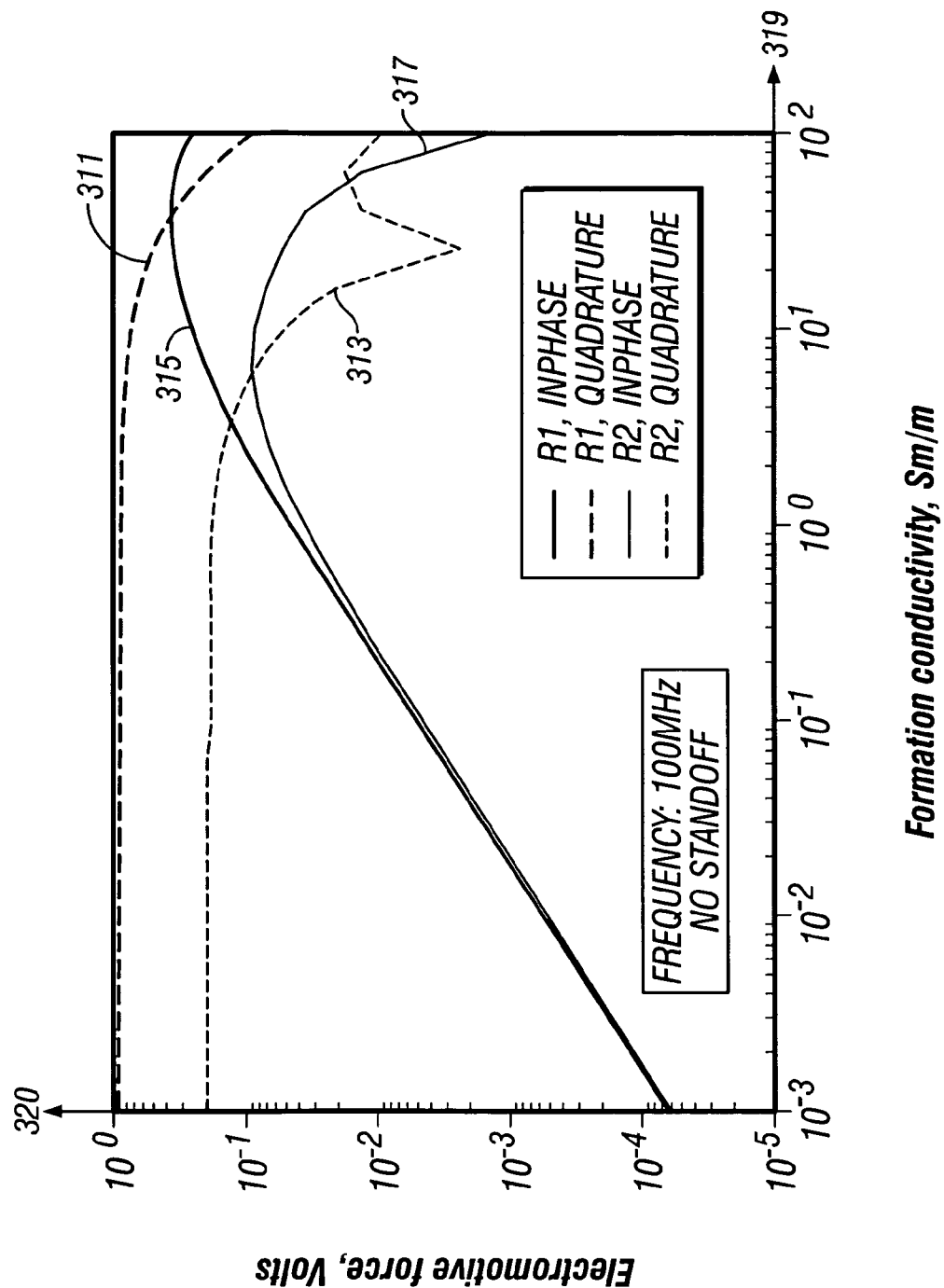
FIG. 9 shows an exemplary response of an antenna arrangement of the present invention for zero standoff at a frequency of 100 MHz.
Figure 10:
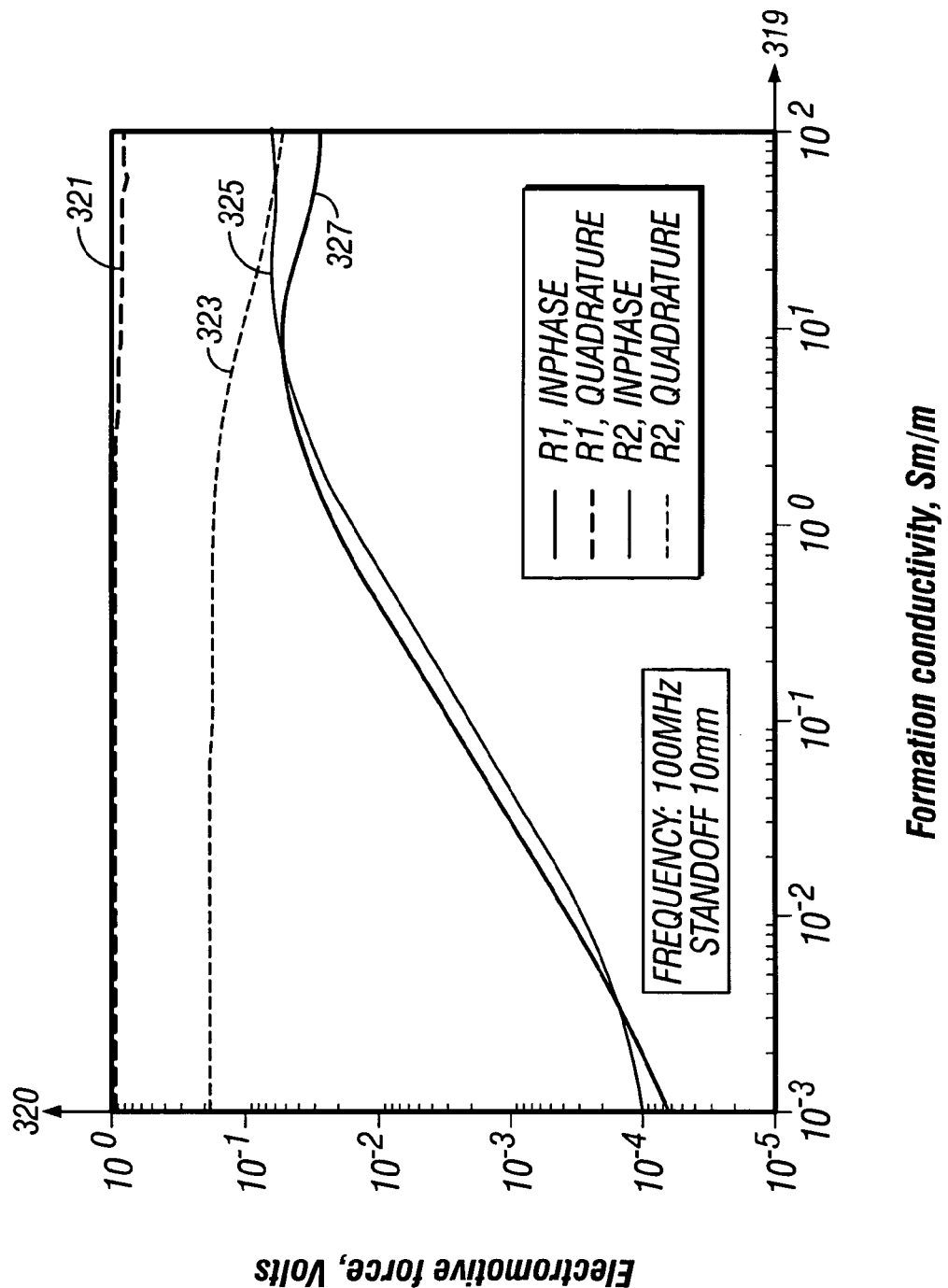
FIG. 10 shows an exemplary response of an antenna arrangement of the present invention for a standoff of 10 mm at a frequency of 100 MHz.

Referring to FIG. 9, the response of the model with zero standoff is shown. The abscissa 319 is the formation conductivity and the ordinate 320 are the signal components in the two receiver coils. Plots 311 and 313 are the quadrature components of the signals in the receivers R1 and R2 while plots 315 and 317 are the in-phase components of the signals in the receivers R1 and R2. For comparison, FIG. 10 shows a comparison with a standoff of 10 mm. The curves 321 and 323 are the quadrature components of the signals in the receivers R1 and R2 while 325 and 327 are the in-phase components of the signals in the receivers R1 and R2.

Examination of FIGS. 9 and 10 shows that in-phase components 315, 317 of the electromotive force induced in the receivers exhibits good sensitivity (and linearity over a wide range of formation conductivity) with respect to the formation conductivity. A standoff of 10 mm does not have a significant effect on the sensitivity.

Figure 11:
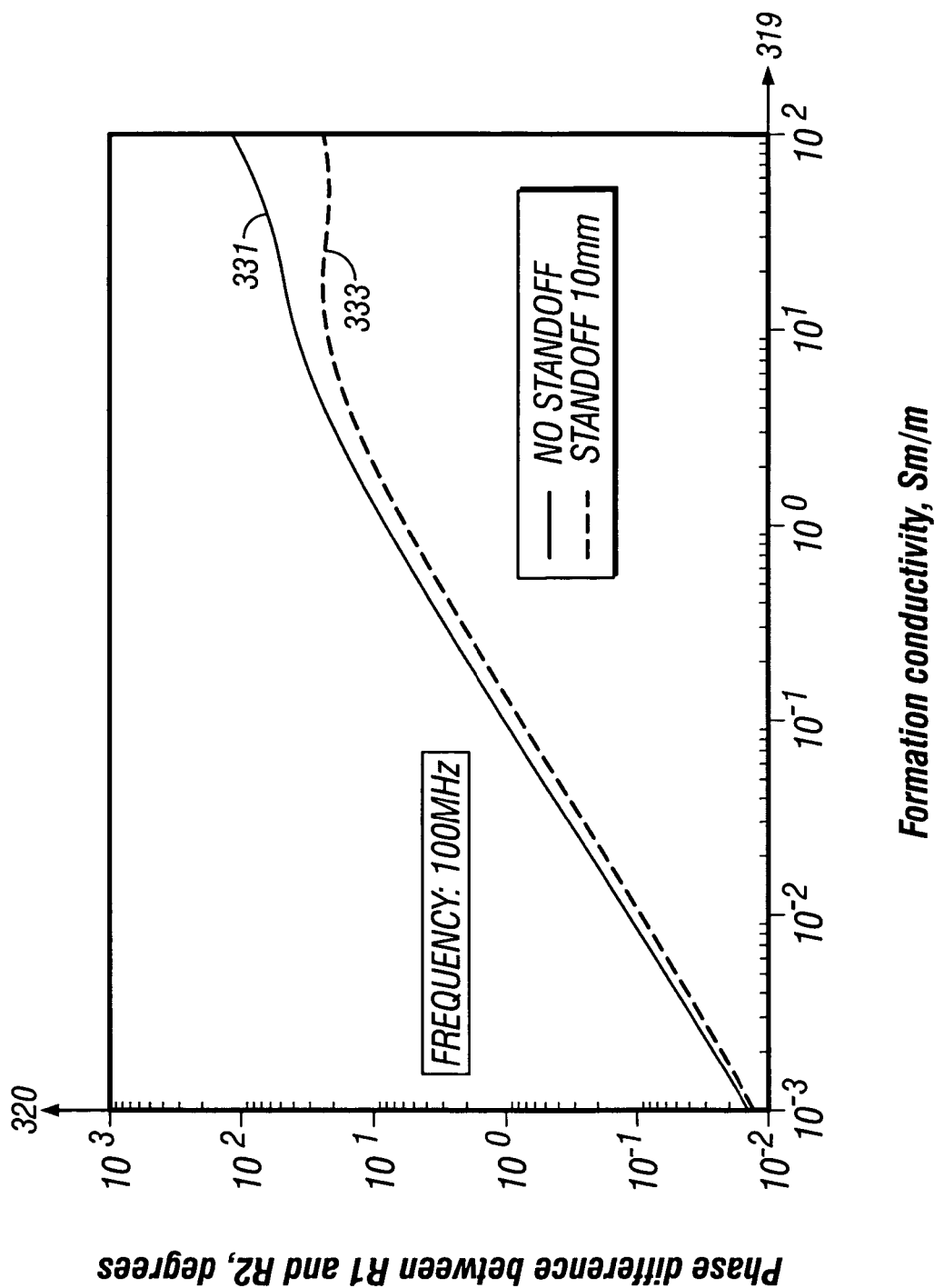
FIG. 11 shows an exemplary variation of an antenna response (phase) to formation conductivity.

Turning now to FIG. 11, the difference between the two receivers is plotted (ordinate) as a function of the formation conductivity (abscissa). The curve 331 is for zero standoff while the curve 333 is for a standoff of 10 mm. Examination of FIG. 11 shows that the phase difference is almost linearly proportional to the formation conductivity in the range of 0.001-1 Sm/m, and it reaches 10° for 1 Sm/m (FIG. 4). For conductivities exceeding 1 Sm/m the sensitivity of the phase difference is getting worse. However, as discussed next, for high conductivity formations (>1 Sm/m), the phase difference becomes quite sensitive to formation conductivity.

Figure 12:
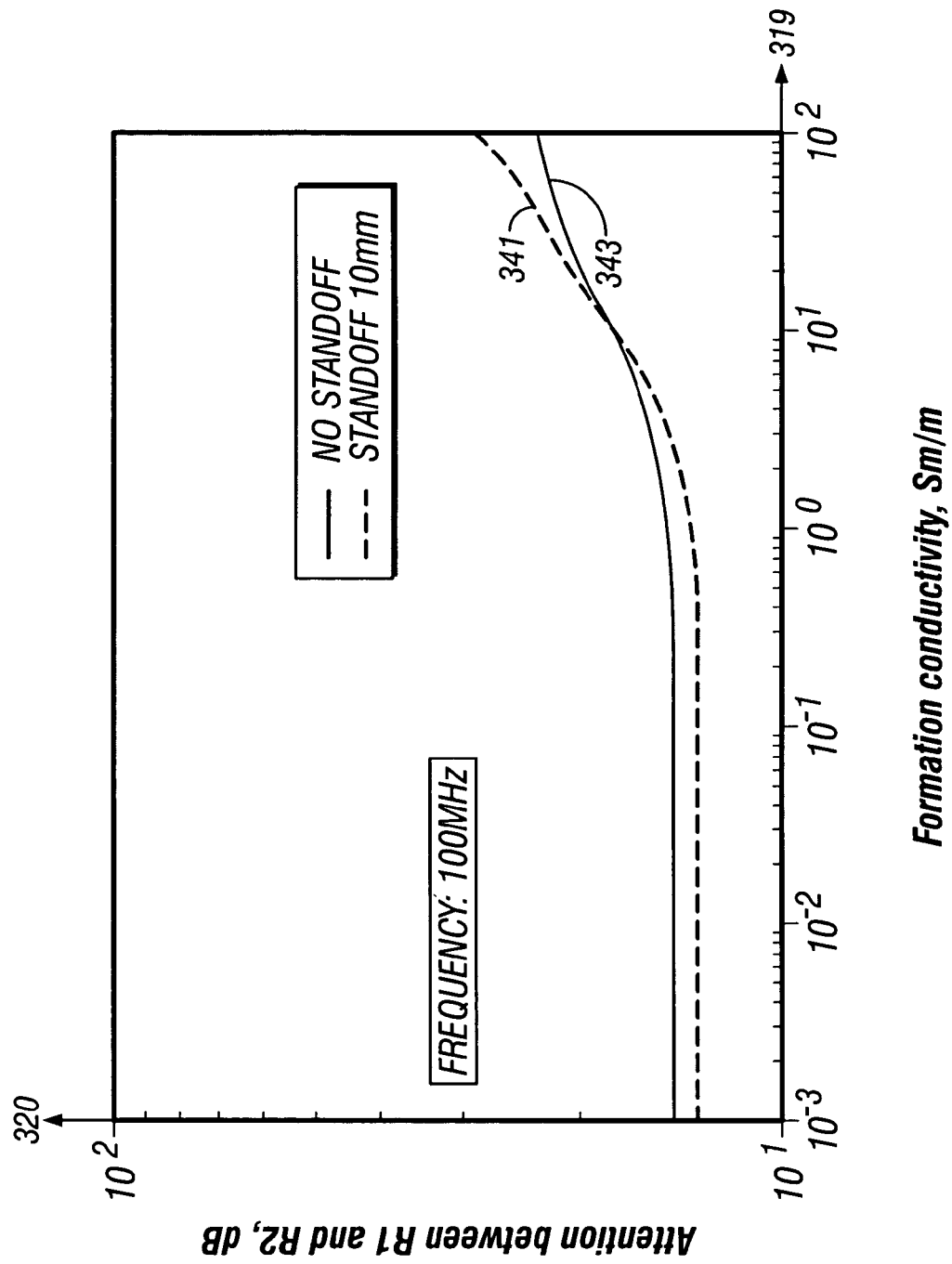
FIG. 12 shows an exemplary variation of an antenna response (amplitude) to formation conductivity.

Turning now to FIG. 12, the attenuation between the two receivers plotted as a function of formation conductivity. The curve 341 is for zero standoff while the curve 343 is for a standoff of 10 mm. As noted above, in the range of formation conductivities where the phase difference becomes insensitive to the conductivity, the attenuation difference becomes sensitive to the conductivity.

Figure 13:
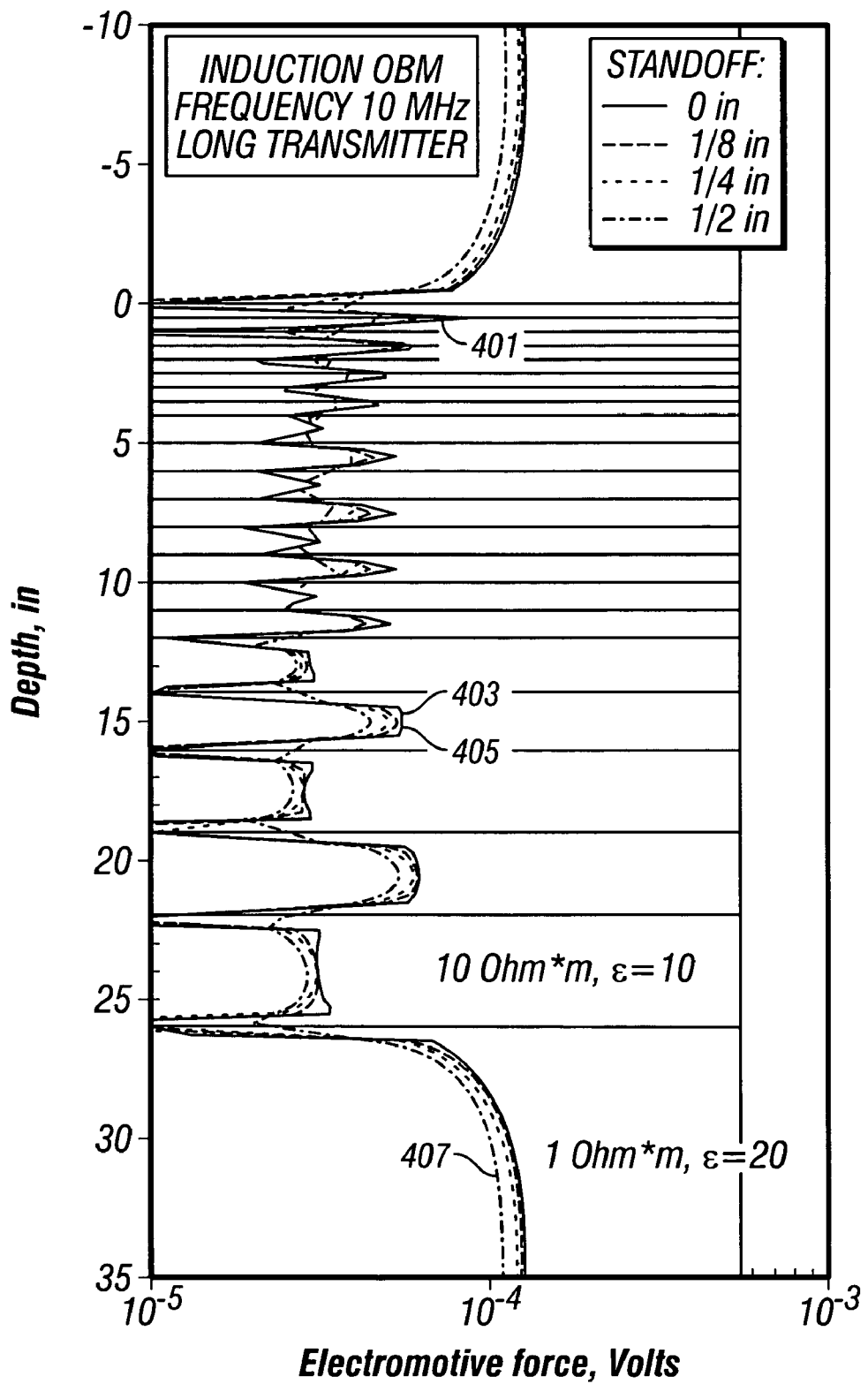
FIG. 13 illustrates the response of the apparatus of the present invention to a layered model at different standoffs.

Turning now to FIG. 13, results of a numerical simulation are shown. The model consists of 23 horizontal layers. Layers 1 and 23 (the first and the last ones) are infinitely thick, layers 2-9 are ½ inch (1.27 cm) thick, layers 10-17—1 inch (2.54 cm) thick, layers 18-19—2 inches (5.08 cm) thick, layers 20-21—3 inches (7.63 cm) thick, layer 22—4 inches (10.16 cm) thick. The thicknesses of the beds were chosen basing on expected vertical resolution of the tool (about 1" (2.54 cm)). The results of simulation for the model (for different values of the tool-formation standoff) are presented in FIG. 13. The curve 401 corresponds to zero standoff, 403 to a standoff of 0.125 in. (3.18 mm), 405 to a standoff of 0.25 in. (6.34 mm), and 407 to a standoff of 0.5 in (1.27 cm). It can be seen that the induction imager can read 1 inch (2.54 cm) beds for the standoff not exceeding 0.5 inches (1.27 cm). The variation of the signal in 1 inch (2.54 cm) layering is about 1.8 for zero standoff and about 1.2 for ½ inch (1.27 cm) standoff. The thinner ½ inch (1.27 cm) beds are read for the standoff not exceeding ¼ inch (6.33 mm). The induction signal is almost monotonic but it has narrow and deep minimums at layer boundaries; the depth of these minimums decreases with increase of the standoff.

Figure 14:
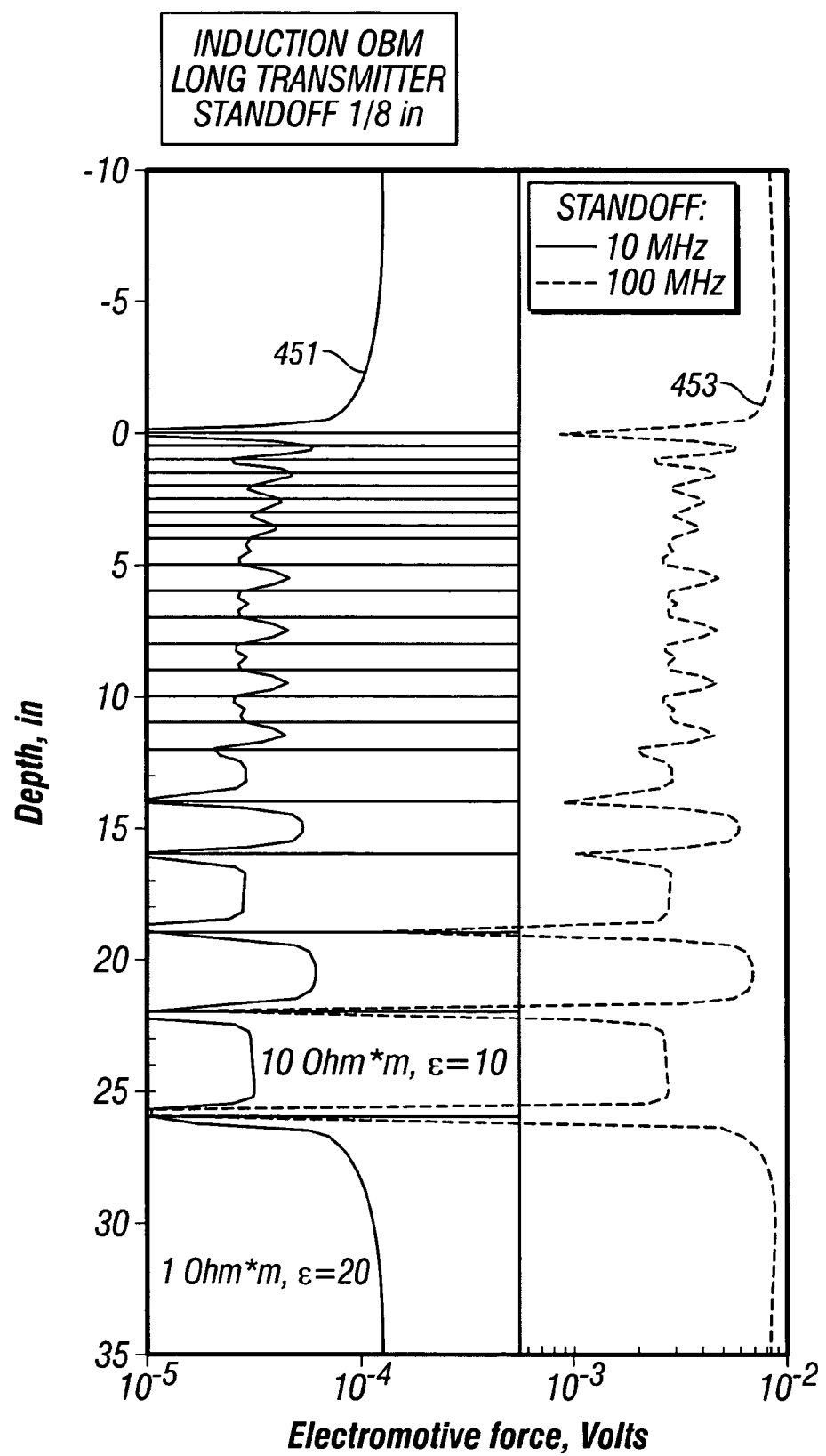
FIG. 14 illustrates the response of the apparatus of the present invention to a layered model at a standoff of 0.125 in and different frequencies.

In FIG. 14, the logs for the same model but different frequencies, 10 and 100 MHz, are compared. As it was expected, there is no significant qualitative difference between these cases—just the signal for 100 MHz 453 is about 70-100 times greater (depending on formation resistivity) than for 10 MHz 451. The variation of the coefficient of magnification is probably caused by the skin effect. Thus, we can conclude that a value of the operational frequency has little impact on the tool resolution. So, it should be chosen from other reasons (a required level of the signal, feasibility of a corresponding hardware etc.).

Figure 15:
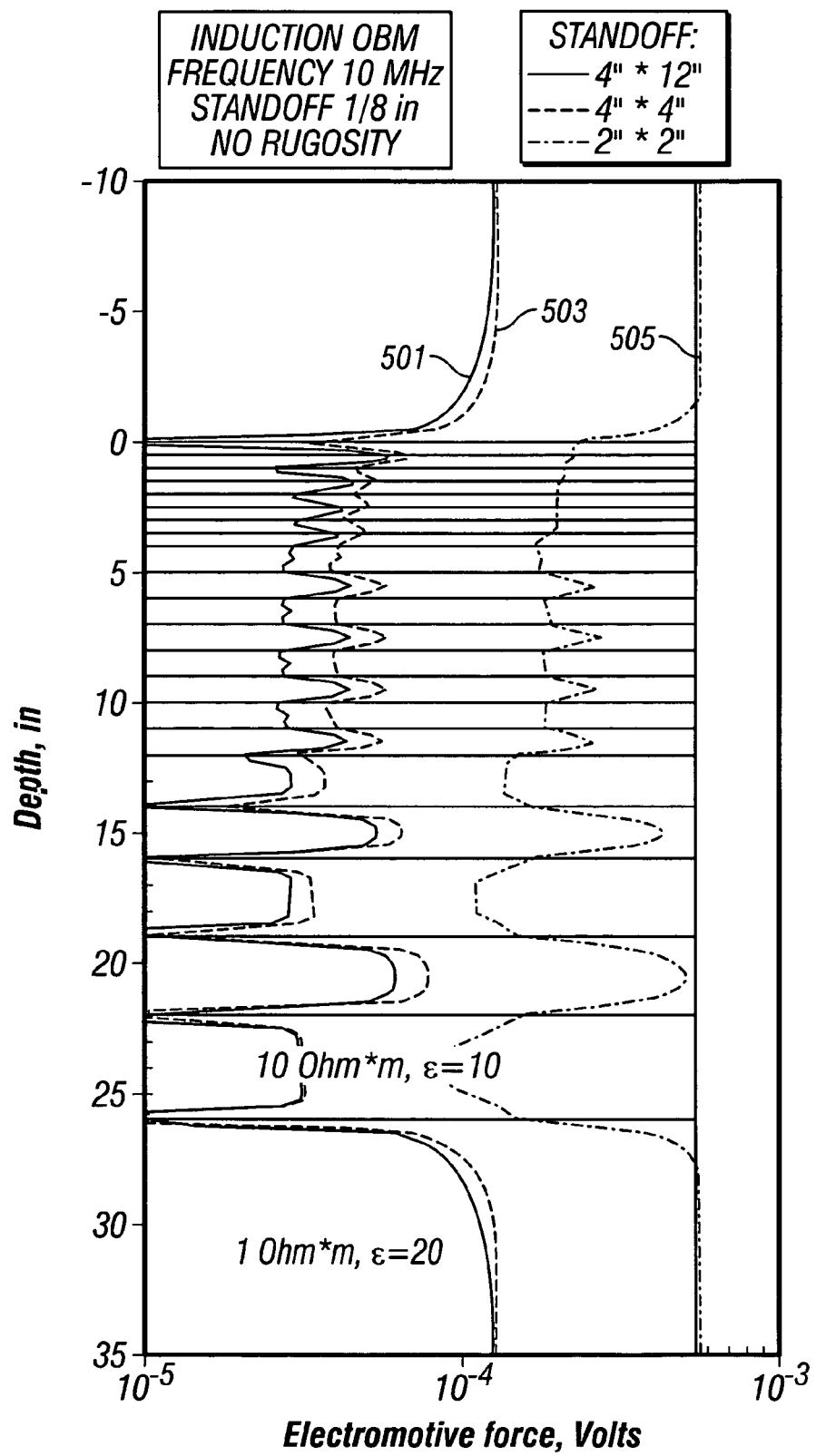
FIG. 15 shows the effect of antenna size on the receiver signal.

Turning now to FIG. 15, examples of the effect of the transmitting coil size are shown. They are 4"×12" (10.16 cm×30.48 cm) size 501 (referred to as a long transmitter), 4" by 4" (10.16×10.16 cm) size 503 (referred to as a short transmitter) and 2" by 2" (5.08×5.08 cm) size 505 (referred to as a small transmitter). The logs for the long, short and small tools are compared in FIG. 15. It can be seen that, for no rugosity, smaller tools produce a smoother signal. Besides that, the smaller is the transmitter, the greater is variation of the response (between resistive and conductive beds) in thick layers (2" or 5 cm and more). But in 1" (2.54 cm) layering all the tools give about the same variation, and the 4"×4" and 2"×2" tools are not able to read ½ inch (1.27 cm) layering.

Figure 16:
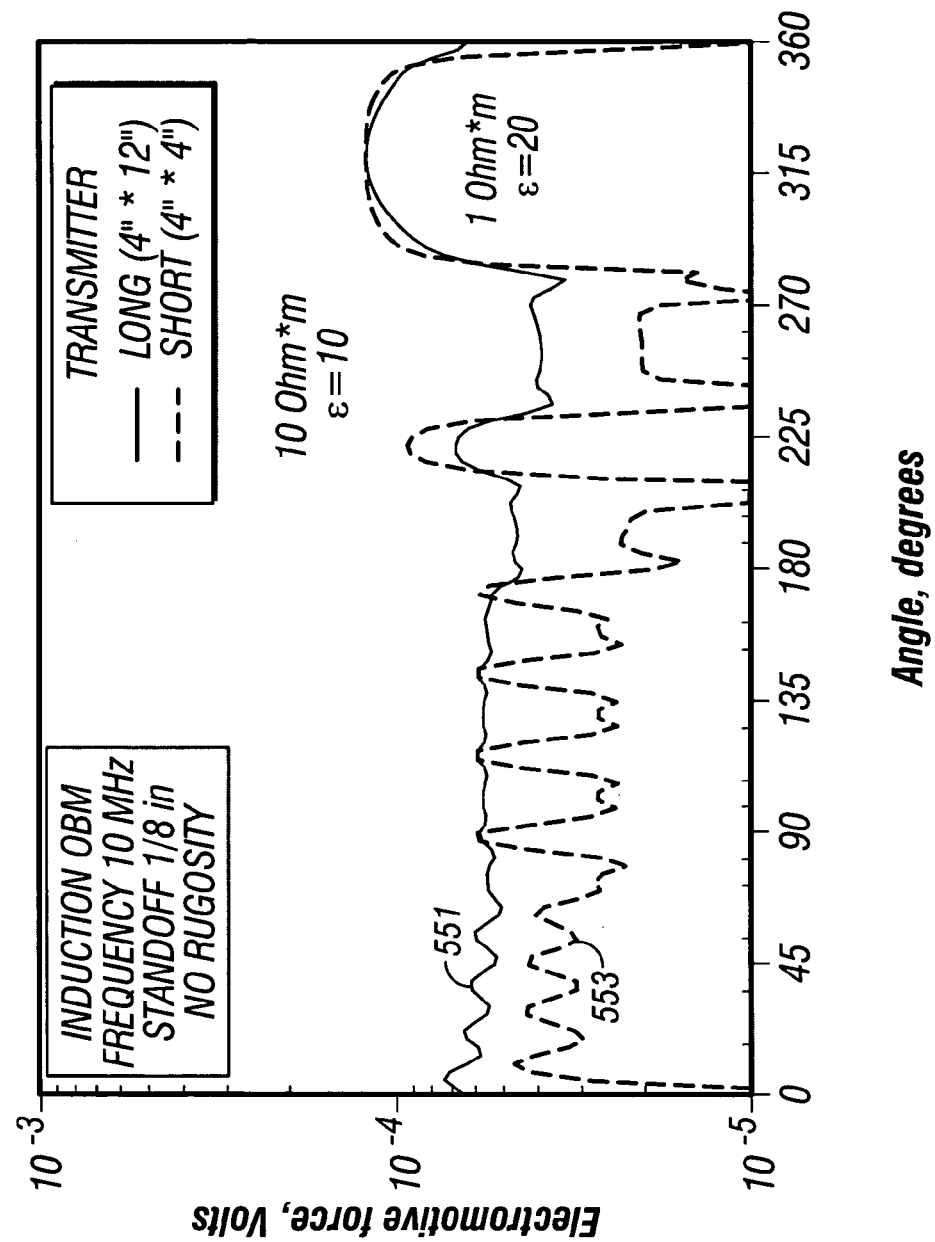
FIG. 16 shows the effect of antenna size on angular sensitivity.

In this section examples of the angular resolution of the long and the short tools are shown. The benchmark model with vertical layers was used—it is depicted as the background in FIG. 16. The electric parameters depend on the angle only (no z-dependence); the thinnest layers are $$8\frac{7}{16}$$

angular degrees wide (that corresponds to 0.644"), then the width is doubled and tripled. The standoff is ⅛", no rugosity. It can be seen from FIG. 16 that the short tool 553 provides much better angular resolution than the long one 551: it reads all vertical layers while the long tool resolves the thickest ones only. It should be pointed out that the examples shown in FIGS. 13-16 are for a borehole that has oil-based mud therein.

Based on the above examples, it is seen that selection of the size of the transmitter and receiver antennas and the operating frequency is based on a number of factors including the desired vertical resolution, the desired angular resolution, and the standoff that may be expected. The likelihood of large standoff is higher for wireline applications than for MWD applications. The processing may be done by a downhole processor, a surface processor, or by a processor at a remote location.

At the frequencies of operation of the present device, dispersion effects due to the dielectric constant of the earth formation may be observable. Accordingly, in another embodiment of the invention, measurements made at two different frequencies are used in combination with a model relating the frequency dependence of dielectric constants to resistivity to determine the formation dielectric constants as well as the formation conductivity (resistivity). Such a method has been discussed in U.S. Pat. No. 5,811,973 to Meyer Jr., having the same assignee as the present invention and the contents of which are incorporated herein by reference.

For wireline applications, with pad mounted sensors having a configuration as shown in FIG. 7, a resistivity image of the earth formation can be obtained. Orientation information is obtained from the orientation package 236. Depth information can be obtained from prior art methods such as cable depth measurements at the surface. Alternatively, downhole accelerometers may be used along with a smoothing process such as that described in a U.S. patent application Ser. No. 10/926,810 of Edwards filed on Aug. 25, 2004 The Edwards application has the same assignee as the present invention and the contents of it are incorporated herein by reference. In large boreholes, the plurality of pads would not offer complete coverage of the borehole wall so that some infilling of the data is necessary.

For MWD applications, a single sensor such as that illustrated in FIG. 2 is adequate. Due to rotation of the drill collar, complete azimuthal coverage can be obtained. There has to be a proper balance between the rate of penetration (ROP) and the rotational speed of the BHA. For example, for a 10 mm×10 mm pixel resolution using a single sensor, ROP (m/hr)<0.6 RPM is necessary (e.g. for RPM=200, ROP<300 m/hr is necessary). This is discussed in copending U.S. application Ser. No. 10/616,857 of Chemali et al., having the same assignee as the present invention and the contents of which are incorporated herein by reference.

Figure 17A:
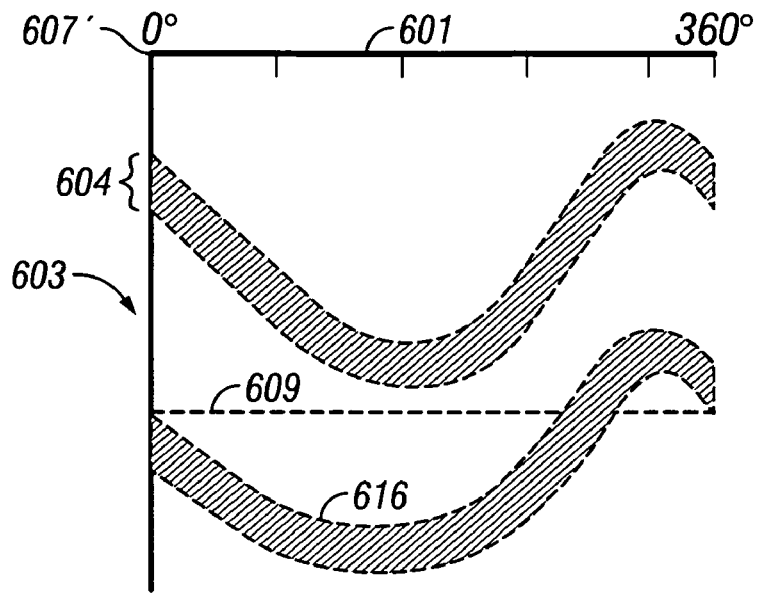
FIGS. 17A, 17B (Prior Art) shows and example of resistivity data from prior art
Figure 17B:
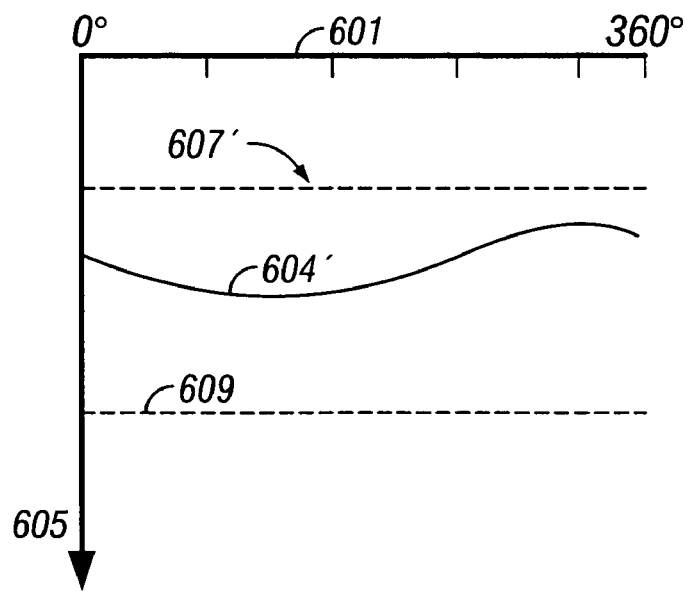

The method of processing of acquired data from an arrangement of formation sensors in U.S. Pat. No. 6,173,793 to Thompson et al. is discussed and may be used in the present invention. FIG. 17A illustrates the "unwrapped" resistivity data that might be recorded by a first resistivity sensor rotating in a vertical borehole as the well is being drilled. The horizontal axis 601 has values from 0° to 360° corresponding to azimuthal angles from a reference direction determine by the directional sensor. The vertical axis 603 is the time of measurement. As the resistivity sensor rotates in the borehole while it is moved along with the drill bit, it traces out a spiral path. Indicated in FIG. 17A is a sinusoidal band 604 corresponding to, say, a bed of high resistivity intersecting the borehole at a dipping angle. After reducing data using filtering methods, the data can be displayed on a depth scale as in FIG. 17B where the vertical axis 605 is now depth and the horizontal axis 601 is still the azimuthal angle with respect to a reference direction. The dipping resistive bed position is indicated by the sinusoid 604'. Such a depth image can be obtained from a time image if at times such as 607 and 609, the absolute depth of the resistivity sensor, 607' and 609' were known.

Depth information may be communicated downhole from a surface location. Alternatively, the method disclosed in U.S. Pat. No. 6,769,497 to Dubinsky et al. having the same assignee as the present application and the contents of which are incorporated herein by reference. The method of Dubinsky uses axial accelerometers to determine a rate of penetration. Alternatively, measurements made using a second resistivity sensor at a different axial position on the drill collar may be used. This is illustrated in FIG. 17A by a second resistivity band 616 corresponding to the same dipping band 604 as measured at a second resistivity sensor above the first resistivity sensor. The spacing between the first and second resistivity sensors being known, a rate of penetration is computed by the microprocessor by measuring the time shift between the bands 604 and 616. The time shift between the bands 604 and 606 could be determined by one of many methods.

One novel feature of the present invention recognizes the fact that downhole depth measurements on a MWD tool are susceptible to error over short intervals. Accordingly, the downhole processor determines an apparent dip of boundaries on a resistivity image assuming a preset rate of penetration or measuring downhole the rate of penetration using z-axis accelerometer, and this apparent dip is sent by telemetry to the surface, along with times and depths at which the image was processed to give the dip estimate. Instead of depth, the actual times of data acquisition and assumed or measured ROP used in the dip determination could also be telemetered. A surface processor would have more accurate depth measurements and rates of penetration corresponding to the times at which the measurements are made, and can therefore correct the apparent dip determination.

The antenna structure of the present invention has been described with reference to the determination of electrical properties of the earth formation. The basic structure incorporating the Litz configuration may also be used for other applications wherein a transmitting generates an electromagnetic field in the earth formation and a receiving antenna receives signals resulting from interaction of the generated electromagnetic field with the earth formation. Specifically, the transmitter may generate pulsed radio frequency fields and the receiver may receive signals resulting from interaction of the RF field with nuclear spins in the earth formation. Typically, a relaxation time of the nuclear spins may be determined. Structures for such nuclear magnetic resonance apparatus are well known in the art and are not described further here.

The operation of the transmitters and receivers, and the control of the drilling direction may be controlled by the downhole processor and/or a surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks. The term "processor" as used herein is intended to include Field Programmable Gate Arrays (FPGAs).

The invention has been described above with reference to a device that is conveyed on a drilling tubular into the borehole, and measurements are made during drilling The processing of the data may be done downhole using a downhole processor at a suitable location. It is also possible to store at least a part of the data downhole in a suitable memory device, in a compressed form if necessary. Upon subsequent retrieval of the memory device during tripping of the drillstring, the data may then be retrieved from the memory device and processed uphole. Due to the inductive nature of the method and apparatus, the invention can be used with both oil based muds (OBM) and with water based muds (WBM).

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for evaluating an earth formation comprising:
   (a) a downhole assembly configured to be conveyed into a borehole in the earth formation;
   (b) at least one transmitter antenna on the downhole assembly configured to propagate an electromagnetic field into the earth formation; and
   (c) at least one receiver antenna substantially concentric with the at least one transmitter antenna, said at least one receiver antenna configured to produce a signal resulting from an interaction of said electromagnetic field with the earth formation, the signal being indicative of a resistivity property-of the earth formation;
   wherein an axis of the at least one receiver antenna and the at least one transmitter antenna is inclined to a longitudinal axis of the borehole.

2. The apparatus of claim 1 wherein said at least one receiver antenna comprises two receiver antennas.

3. The apparatus of claim 1 wherein the downhole assembly is configured to be conveyed into the borehole on a conveyance device selected from (i) a drilling tubular, (ii) a wireline, and (iii) a slickline.

4. The apparatus of claim 1 further comprising a processor configured to estimate a value of the resistivity property of the earth formation from the signal.

5. The apparatus of claim 4 wherein the at least one receiver antenna comprises at least two receiver antennas, and wherein the processor is configured to determine the resistivity property-of the earth formation from at least one of (i) an amplitude ratio of a signal from one of said at least two receiver antennas to a signal from another of said at least two receiver antennas, and, (ii) a phase difference between a signal from one of said at least two receiver antennas and a signal from another of said at least two receiver antennas.

6. The apparatus of claim 4 wherein the processor is further configured to use a toolface angle of the downhole assembly and provide an image of a wall of the borehole.

7. The apparatus of claim 6 further comprising an accelerometer on the downhole assembly, and wherein the processor is further configured to use measurements made by the accelerometer to determine a depth of the downhole assembly.

8. The apparatus of claim 4 wherein the at least one transmitter is configured to be operated at a plurality of frequencies and the processor is configured to determine from signals from the at least one receiver antenna at each of said plurality of frequencies an indication of a dielectric constant of said earth formation.

9. The apparatus of claim 1 wherein at least one of (i) the transmitter antenna, and (ii) the receiver antenna, comprises a cross-over region capable of producing a Litz effect.

10. The apparatus of claim 1 wherein said at least one transmitter antenna and said at least one receiver antenna are incorporated on a printed circuit board.

11. The apparatus of claim 10 wherein said printed circuit board is shaped substantially like a sector of a cylinder.

12. The apparatus of claim 1 further comprising a shield configured to magnetically isolate a metallic portion of a drill collar carrying the downhole assemble from the at least one transmitter antenna and the at least one receiver antenna.

13. The apparatus of claim 1 wherein the at least one transmitter antenna and the at least one receiver antenna are mounted on a pad that is configured to be extendable from a body of said downhole assembly.

14. A method of evaluating an earth formation comprising:
(a) propagating an electromagnetic signal into the earth formation using at least one transmitter on a downhole assembly conveyed into a borehole in the earth formation; and
(b) using at least one receiver antenna substantially concentric with the at least one transmitter antenna for receiving a signal resulting from an interaction of the electromagnetic field with the earth formation, the signal indicative of a resistivity property-of the earth formation;
wherein an axis of the at least one receiver antenna and the at least one transmitter antenna is inclined to a longitudinal axis of the borehole.

15. The method of claim 14 further comprising conveying downhole assembly into the borehole on a conveyance device selected from (i) a drilling tubular, (ii) a wireline, and (iii) a slickline.

16. The method of claim 14 further comprising using a processor to estimate a value of the resistivity property-of the earth formation from the signal.

17. The method of claim 14 further comprising providing, for at least one of (i) the transmitter antenna, and (ii) the receiver antenna, a cross-over region capable of producing a Litz effect.

18. The method of claim 14 further comprising magnetically isolating a metallic portion of a drill collar carrying the downhole assemble from the at least one transmitter antenna and the at least one receiver antenna.

19. The method of claim 14 further comprising positioning the least one transmitter antenna and the at least one receiver antenna on a pad that is extendable from a body of the downhole assembly.

20. The method of claim 14 wherein the at least one receiver antenna comprises at least two receiver antennas, the method further comprising determining the resistivity property-of the earth formation from at least one of (i) an amplitude ratio of a signal from one of the at least two receiver antennas to a signal from another of the at least two receiver antennas, and, (ii) a phase difference between a signal from one of the at least two receiver antennas and a signal from another of the at least two receiver antennas.

21. The method of claim 14 further comprising:
(i) operating the at least one transmitter at a plurality of frequencies, and
(ii) determining from signals from the at least one receiver antenna at each of said plurality of frequencies an indication of a dielectric constant of said earth formation.

22. A computer readable medium for use with an apparatus for evaluating an earth formation, the apparatus comprising:
(a) a downhole assembly configured to be conveyed into a borehole in the earth formation;
(b) at least one transmitter antenna on said downhole assembly configured to propagate an electromagnetic field into the earth formation; and
(c) at least one receiver antenna substantially concentric with the at least one transmitter antenna, said at least one receiver antenna configured to produce a signal resulting from an interaction of said electromagnetic field with said earth formation, said signal indicative of a resistivity property-of the earth formation;
wherein an axis of the at least one receiver antenna and the at least one transmitter antenna is inclined to a longitudinal axis of the borehole;
the medium comprising instructions which enable a processor to determine from the signal the resistivity property-of the earth formation.

23. The medium of claim 22 further comprising at least one of (i) a ROM, (ii) a CD-ROM, (iii) an EPROM, (iv) an EAROM, (v) a flash memory, and (vi) an optical disk.

* * * * *